(12) United States Patent
Porter

(10) Patent No.: X8628
(45) Date of Patent: Feb. 6, 1835

(54) PRESS, CHEESE, SELF-ADJUSTING

(76) Inventor: Rufus Porter

Rufus Porter, of Billerica, Mss:
Letters Patent

The schedule referred to in these Letters Patent and making part of the same, containing a description in the words of the said Rufus Porter himself of his improvement in the Press, called the self adjusting cheese Press. - -

To all to whom these presents shall come:

Be it known that I, Rufus Porter of Billerica, in the County of Middlesex, and State of Massachusetts have invented a new & useful improvement in presses, called self-adjusting cheese press, and that the following is a full & exact description of the construction & operation of said press as invented or improved by me. -

Two posts five feet long four inches wide & two inches thick, are placed parallel to each other two feet apart, and having a cap piece across the tops, and two pieces of plank twenty eight inches long & six inches wide, are nailed to the bottoms, crossing from one to the other: and two other pieces eighteen inches long are nailed one to each post crossing at right angles with the first, and by which the posts are supported in an upright position. Two planks one of them ten, and the other six inches wide extend horizontally from one post to the other and constitute the bed & follower of the press. These are not attached to the posts, but the ends of the bed plank are attached by tenons or nails, to four vertical sliding guides, two at each end; one of which is placed on each side of each post. These sliding guides are sixteen inches long extending two inches below, & twelve inches above the bed plank, which is also further supported by two cleats, one of which passes beneath each end of the plank, and is secured to the guides. -

A small shaft having a gudgeon or pivot at each end, and a pulley three inches in diameter near each end, extends from one cleat to the other, under the centre of the plank. The ends of the follower plank which is placed about six inches above the bed-plank, are attached to two vertical sliding planks, which are ten inches long & four inches wide, being guided, or kept in place by the four sliding guides, the two pairs of which are an inch less distant, than the two posts. Another shaft crosses above the follower, having gudgeons or pivots which enter the sliding planks. This shaft has a pulley, or grooved wheel on its centre, of nine inches diameter - a groove at each end of two inches diameter, and other two grooves near the first of three inches diameter. Two small ropes are made fast to the shaft within the two small grooves, and proceed thence downward through both planks - under the pulley and thence upward to the larger grooves - passing twice round the shaft, and are then made fast. another cord extends from the cappiece downward - twice round the large pulley, thence upward over a small pulley which is attached to the cap; the end of the cord being at liberty. By this cord the press planks &c. are drawn upward, by which process the ropes are given off from the larger grooves, and are taken up by the smaller: the planks are thus permitted to separate, and a cheese may be placed between them, when, if permitted to descend, the press planks will approach each other, and produce a pressure equal to eighteen times the weight of the cheese to be thus pressed. —

I claim as original, the arrangement of the pressing planks, guides, shafts, & pulleys; and the application to the pressing of cheese, of the principle whereby pressure is produced by giving off a rope from a smaller part of a shaft at the same time that it is taken up by a larger part.

Witnesses
Tracy Peck
Rachel R. Peck

Rufus Porter

Exd
[illegible]